C. E. POWERS.
HARROW ATTACHMENT FOR CORN PLANTERS.
APPLICATION FILED AUG. 31, 1914.
1,136,975.
Patented Apr. 27, 1915.
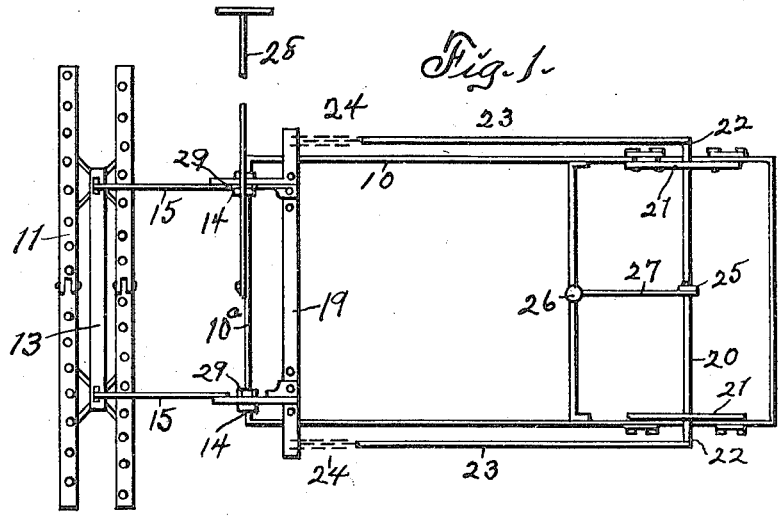
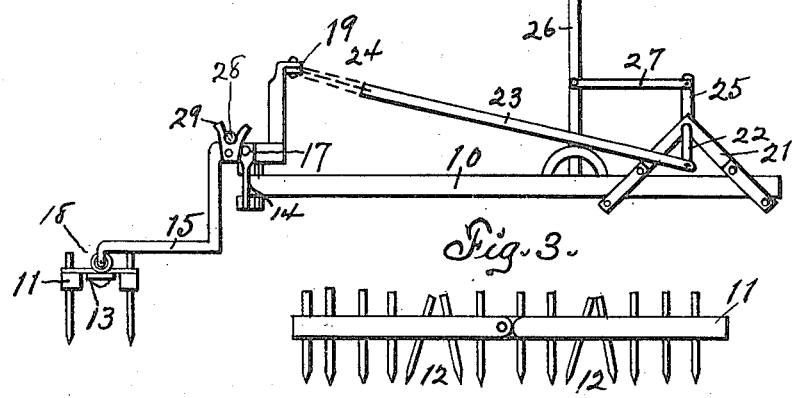
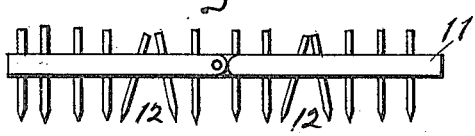
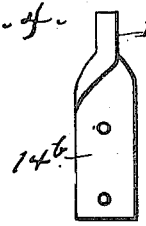
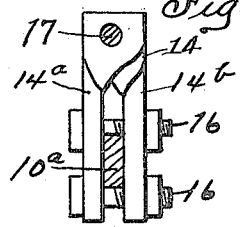
Attest:
Ralph G. Palmer
Will Cochran
Inventor:
Clarence E. Powers
THE NORRIS PETERS CO., PHOTO-LITHO., WASHINGTON, D. C.

UNITED STATES PATENT OFFICE.

CLARENCE E. POWERS, OF MONROE TOWNSHIP, MADISON COUNTY, IOWA, ASSIGNOR OF ONE-THIRD TO W. C. GRANDFIELD, OF LORIMOR, IOWA.

HARROW ATTACHMENT FOR CORN-PLANTERS.

1,136,975. Specification of Letters Patent. Patented Apr. 27, 1915.

Application filed August 31, 1914. Serial No. 859,327.

*To all whom it may concern:*

Be it known that I, CLARENCE E. POWERS, a citizen of the United States of America, and resident of Monroe township, Madison county, State of Iowa, have invented a new and useful Harrow Attachment for Corn-Planters, of which the following is a specification.

The object of this invention is to provide means for treating the soil surface following the planting of corn or other seeds.

A further object of this invention is to provide means for harrowing a seed bed simultaneously with the planting of seeds, such as corn, therein.

A further object of this invention is to provide attachments for a planter, such as a corn-planter, whereby a harrow may be drawn by the planter and also whereby said harrow, together with marking devices, may be raised at the same time the planting mechanism is raised for reversing the direction of the planter or to remove the same from a field.

My invention consists in the construction, arrangement and combination of elements hereinafter set forth, pointed out in my claims and illustrated by the accompanying drawings, in which—

Figure 1 is a plan showing the manner of applying my improved devices to a planter frame. Fig. 2 is a side elevation of the same. Fig. 3 is a rear elevation of the harrow employed. Figs. 4 and 5 are elevations, in detail, showing the construction and manner of mounting clamps employed in securing the attachments to the planter frame.

In the construction of the devices as shown the numeral 10 designates a planter frame, which is shown conventionally and may be of any desired size, shape and material. A harrow 11 is arranged at the rear and transversely of the path of travel of the planter frame and is of such length as to compass the surface being planted and overlap the spaces between rows. The harrow 11 preferably comprises parallel bars flexibly connected and each bar preferably is hinged at its center and arranged to articulate on a horizontal axis. The harrow teeth may be of any desired style, size and shape and preferably are so arranged as to provide A-shaped spaces 12 to straddle and accommodate the planted rows. In such manner provision is made for filling and smoothing any ruts or depressions made by the runners or wheels of the planter and the feet of draft animals at the same time the remaining surface of the soil is harrowed and broken. The harrow 11 preferably is provided with a draft-bar 13 connected at its ends to both of the harrow-bars and adapted to draw and lift them conjunctively on occasion. Bearings 14, 14 are clamped to and rise from the frame 10 and bell-crank levers 15, 15 are fulcrumed in said bearings. The bearings 14 are illustrated in detail in Figs. 4 and 5 and comprise like clamp members $14^a$, $14^b$ connected by bolts 16 and adapted to embrace a bar $10^a$ of the frame. The upper ends of the clamp members are twisted a quarter-turn and brought into parallel planes and are apertured in registration to receive a bolt 17 on which a bell-crank is fulcrumed. One arm of each bell-crank 15 extends rearwardly from its fulcrum, is bent and extends downwardly at the rear of the frame 10, is bent again and extends rearwardly to and above the draft-bar 13 to an end portion of which draft-bar it is attached flexibly as by an eye-bolt 18. Each eye-bolt 18 preferably extends through the draft bar and is pivoted, by means of its eye, in the downturned extremity of the bell-crank. The remaining arm of each bell-crank 15 extends upwardly in front of its fulcrum and is twisted and also bent forwardly at its upper end. A floating bar 19 is secured to and carried by the forwardly-bent extremities of the foremost arms of the bell-cranks and extends across and in a horizontal plane above the frame 10.

A crank-shaft 20 is mounted for oscillation in suitable bearings 21, 21 and extends across the forward portion of the frame 10. The bearings 21, 21 are suitably clamped to and rise from the frame 10 and are suitably braced. Downwardly extending cranks 22, 22 are formed on end portions of the shaft 20 and are flexibly and adjustably connected to end portions of the floating bar 19 such as by rods 23, 23 and chains 24, 24. The connections between the floating bar 19 and bell-cranks also are adjustable. An arm 25 is formed on and rises from the central portion of the shaft 20 and said arm is pivotally connected by a rod 27, at its upper end, to a hand-lever 26 fulcrumed on the planter frame 10, which hand-lever also may be employed to raise the runners. In other words, the lever 26 may be the same as commonly is found on corn planters and employed to raise the planting mechanism when the device is inoperative, such as in transporting to and from the field and turning about at the ends of the rows.

A marker 28 is shown conventionally, which is pivoted at one end to the central portion of the rear of the frame 10 and is adapted to be moved through an arc and extend laterally from either side of said frame. The marker 28 extends across one or another of seats 29, 29 mounted on the bell-cranks at the rear of the fulcrums thereof, in order that the marker may be raised clear of the soil surface whenever the bell-cranks are oscillated by manipulation of the hand-lever 26 rearwardly.

When the hand-lever 26 is moved rearwardly through an arc the floating-bar 19 is moved forwardly thereby, through the connections provided therefor, to the end of so actuating the bell-cranks as to raise the harrow clear of the soil surface, as is desirable in transporting the devices to and from a field or turning about at the ends of the rows.

I claim as my invention—

1. A planter attachment comprising a harrow and means adapted to be carried on the planter frame for drawing and raising said harrow, said means comprising bell-cranks pivoted on the planter frame, a bar adjustably connecting said bell-cranks, a crank-shaft journaled on the planter frame, rods pivoted at their forward ends to arms of said crank-shaft, chains flexibly connecting the rear ends of said rods to end portions of said bar, and means for oscillating and locking said crank-shaft.

2. The combination of a support, bell-cranks fulcrumed thereon, a harrow carried by said bell-cranks at the rear and transversely of said support, and a hand-lever adjustably and flexibly connected to and adapted to oscillate said bell-cranks.

3. The combination of a support, bell-cranks fulcrumed thereon, a harrow carried by said bell-cranks at the rear of the support, a floating-bar connecting said bell-cranks adjustably, a crank-shaft on the support, flexible connections between said crank-shaft and bell-cranks, and a hand-lever adapted to oscillate said crank-shaft.

4. The combination of a support, bell cranks fulcrumed thereon and arranged on opposite sides of the center thereof, means for oscillating said bell-cranks, an arm pivoted to said support and adapted to be moved through an arc across said bell-cranks, and means on said bell-cranks adapted to engage said arm.

CLARENCE E. POWERS.

Witnesses:
WILL COCHRAN,
RALPH P. PALMER.